May 16, 1961 S. J. WOOLLEY 2,984,122
TRANSMISSION MECHANISM
Filed May 27, 1958 3 Sheets-Sheet 2
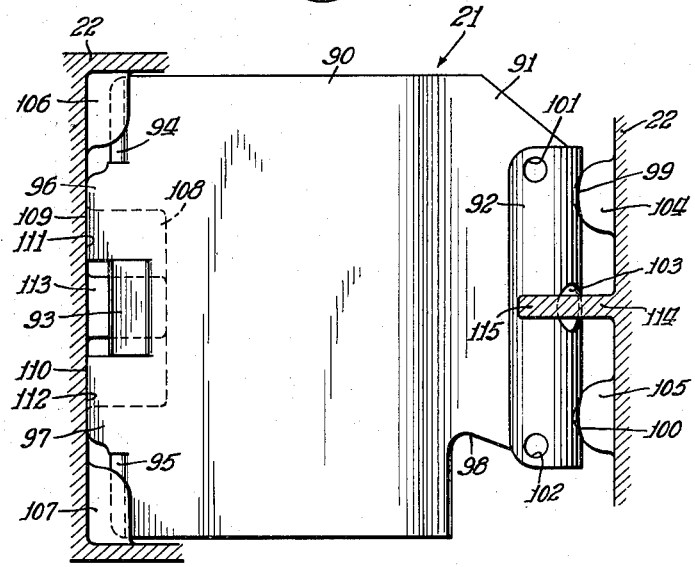
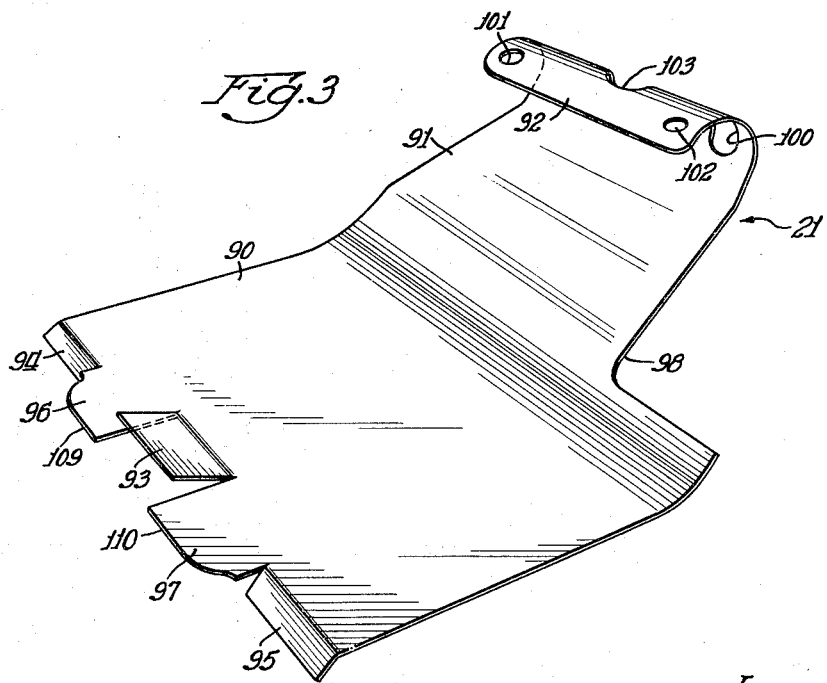
Inventor:
Samuel J. Woolley
By: Ray E. Snyder Atty.

May 16, 1961  S. J. WOOLLEY  2,984,122
TRANSMISSION MECHANISM
Filed May 27, 1958  3 Sheets-Sheet 3
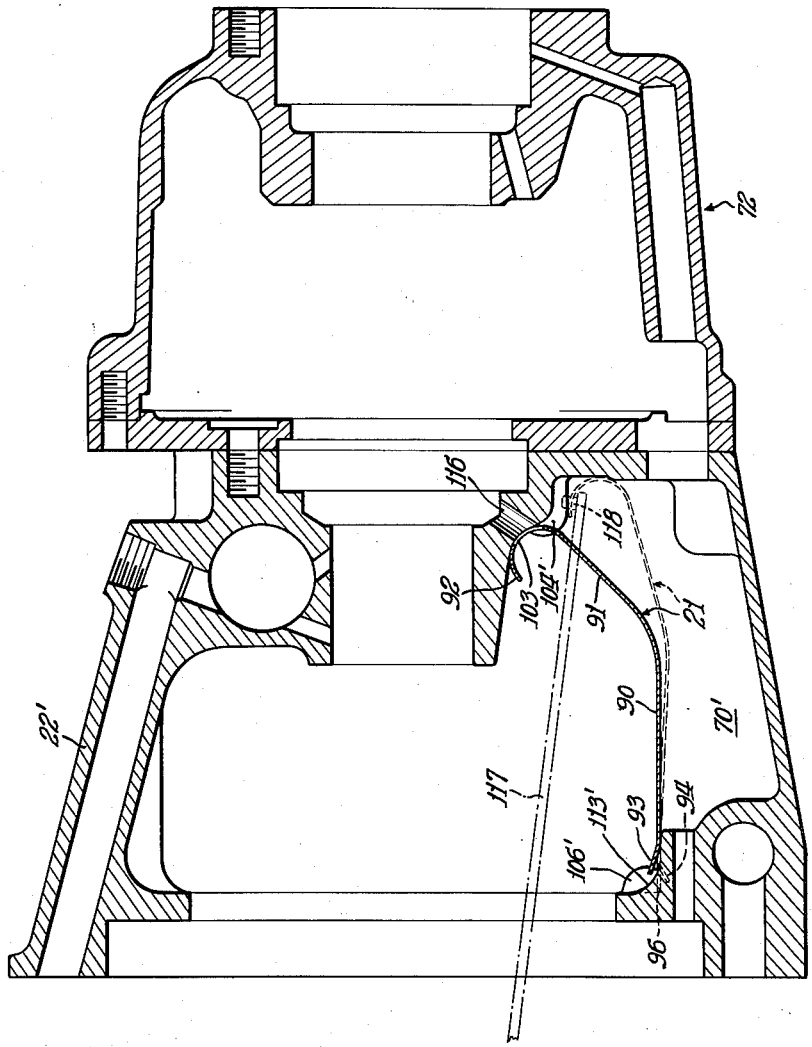
Inventor:
Samuel J. Woolley
By: Ray E. Snyder Atty.

United States Patent Office 2,984,122
Patented May 16, 1961

2,984,122
TRANSMISSION MECHANISM

Samuel J. Woolley, Muncie, Ind., assignor to Borg-Warner Corporation, Chicago, Ill., a corporation of Illinois Filed May 27, 1958, Ser. No. 738,099

5 Claims. (Cl. 74—606)

This invention relates to a transmission mechanism, including hydraulic fluid circulating means therefor.

This invention constitutes an improvement to the transmission mechanism illustrated in the related pending applications of D. W. Kelbel, Serial No. 641,125, filed February 19, 1957, now Patent No. 2,877,668, and of P. Orr, Serial No. 715,723 filed February 17, 1958.

It is an object of the present invention to provide an improved transmission mechanism having means for circulating hydraulic fluid through the mechanism, and means for suppressing excess turbulence of the fluid circulated therethrough.

It is another object to provide a transmission mechanism having hydraulic fluid circulating means associated therewith including a fluid ejector, and baffle means effective to limit fluid turbulence created by said fluid ejector.

It is still another object to provide a transmission mechanism including a housing defining a fluid sump in the bottom interior thereof, hydraulic fluid circulating means associated with the transmission including a fluid ejector, and a baffle plate adapted to be disposed within said transmission housing and effective to suppress fluid turbulence created within said transmission housing by said fluid ejector and by rotating parts of the transmission.

It is an additional object of the present invention to provide a hydraulically operated transmission mechanism comprising a housing which defines a fluid sump, planetary gearing rotatably mounted within the housing, and baffle means effective to separate the fluid contained within the sump from the planetary gearing.

It is still another object to provide a baffle plate made of unitary resilient sheet material and adapted to be inserted within a hydraulically operated transmission housing for separating certain rotating parts of the transmission from the hydraulic fluid contained within the housing.

The invention consists of the novel constructions, arrangements and devices to be hereinafter described and claimed for carrying out the above stated objects and such other objects as will appear from the following description of a preferred form of the invention, illustrated with reference to the accompanying drawings, wherein:

Fig. 2 is a top view of the baffle plate taken on line 2—2 of Fig. 1;

Fig. 3 is a perspective view of the baffle plate; and

Fig. 4 is a longitudinal sectional view of a transmission housing illustrating the method of inserting the baffle plate therein.

Like characters of reference designate like parts in the several views.

Figure 1:
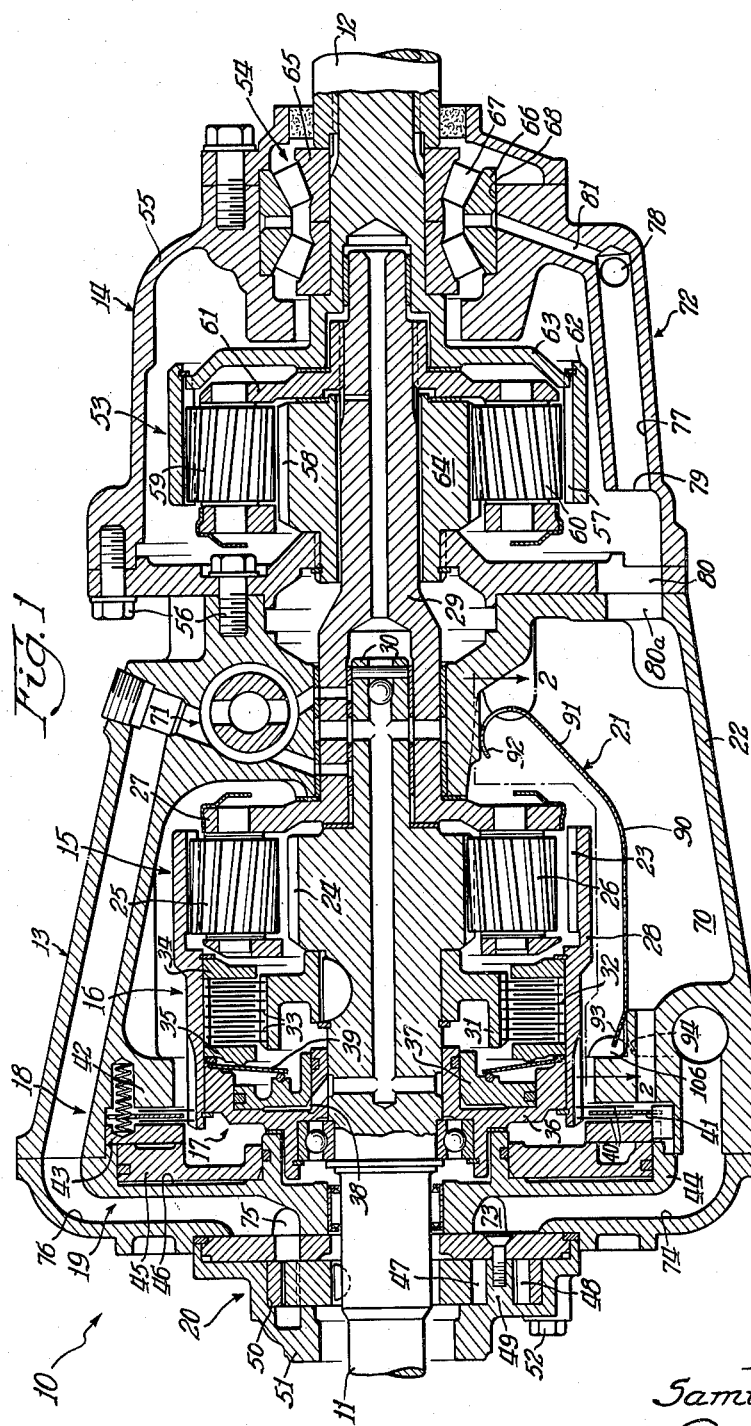
Fig. 1 is a longitudinal sectional view of the transmission mechanism of the present invention, including a baffle plate disposed within the transmission housing.

Referring now to Fig. 1, a transmission mechanism 10 is shown which includes a drive shaft 11, a driven shaft 12, a forward transmission unit 13, and a rear transmission unit 14. The drive shaft 11 is connected to a driving engine through any suitable means (not shown), and the driven shaft 12 is connected to a propeller shaft through any suitable means (not shown).

The forward transmission unit 13 in general comprises a duplex planetary gear set 15, a multiple plate direct drive clutch 16, a hydraulic servomotor 17 for engaging the clutch 16, a reverse drive brake 18, a hydraulic servomotor 19 for engaging the brake 18, a fluid pump 20, and a baffle plate 21 disposed beneath the planetary gearing 15, all enclosed within a transmission housing 22.

The duplex planetary gear set 15 comprises a ring gear 23, a sun gear 24 formed on an enlarged portion of the drive shaft 11, a plurality of planet gears 25 and 26, and a planet gear carrier 27. The planet gears 25 and 26 are in mesh with each other and are rotatably carried by the carrier 27. The planet gears 25 also are in mesh with the ring gear 23 and the planet gears 26 are in mesh with the sun gear 24. The ring gear 23 is formed in the interior of a drum 28, and the planet gear carrier 27 is formed integrally with an intermediate shaft 29 journalled within the housing 22. An extended end portion 30 of the drive shaft 11 is piloted within one end of the intermediate shaft 29.

The direct drive clutch 16 comprises the outer drum 28, an inner drum 31 keyed to the drive shaft 11, a plurality of friction discs 32 splined within the outer drum 28 and a plurality of friction discs 33 splined to the inner drum 31 and interleaved with the discs 32. The friction discs 32 and 33 are sandwiched between an annular fixed end pressure plate 34 splined within the drum 28 and an axially movable annular pressure plate 35 slidably disposed within the drum 28.

The hydraulic servomotor 17 comprises an annular casing 36 journalled on the drive shaft 11 and supporting the drum 28 and an annular piston 37 slidably disposed within an annular cavity 38 formed in the casing 36. A Belleville-type washer 39 is interposed between the piston 37 and the movable end pressure plate 35 of the clutch 16. The washer 39 is pivotally disposed with its outer periphery against the annular casing 36 and in contact with the piston 37 near its inner periphery. The washer 39 also is in contact with the movable pressure plate 35 of the clutch 16 at a point near its outer periphery so that the body of the washer can function as a lever in engaging the clutch 16.

The reverse drive brake 18 comprises two friction discs 40 splined on the exterior of the drum 28, a friction disc 41 disposed between the friction disc 40 and relatively fixed with respect to the housing 22. The friction discs 40 are sandwiched between a portion of the transmission housing 22 constituting a fixed end pressure plate 42 and an annular axially movable pressure plate 43.

The servomotor 19 for engaging the reverse drive brake 18 comprises an annular casing portion 44 formed in the housing 22 and an annular piston 45 slidably disposed within an annular cavity 46 formed in the casing portion 44. The piston 45 abuts directly against the movable pressure plate 43 of the brake 18 and is adapted to press the friction discs 40 and 41 into engagement with each other and with the fixed end pressure plate 42.

The fluid pump 20 comprises an inner gear 47 keyed to the drive shaft 11, an outer gear 48 in mesh with and eccentrically disposed with respect to the gear 47, and a crescent-shaped barrier member 49 fixedly disposed between the eccentric gears 47 and 48. The gears 47 and 48 are rotatably disposed within an annular cavity 50 formed in a casing portion 51 and the casing portion 51 is attached to the housing 22 by a plurality of machine screws 52.

The rear transmission unit 14 in general comprises a duplex planetary gear set 53, a bearing block 54 for rotatably supporting the driven shaft 12, and a housing 55. The housing 55 is attached to the housing 22 by means of a plurality of machine screws 56.

The planetary gear set 53 comprises a ring gear 57, a sun gear 58, a plurality of planet gears 59 and 60, and a planet gear carrier 61. The planet gears 59 and 60 are in mesh with each other and are rotatably carried by planet gear carrier 61. The planet gears 59 are also in mesh with the ring gear 57 and the planet gears 60 are in mesh with the sun gear 58. The ring gear 57 is formed on the interior of a drum 62 which is splined to and carried by an enlarged annular portion 63 of the driven shaft 12. The planet gear carrier 61 is splined to the exterior of the intermediate shaft 29, and the sun gear 58 is formed on an annular hub 64 anchored within the housing 55.

The bearing block 54 comprises two adjacent sets of roller bearings each having an inner race 65, an outer race 66, and a plurality of tapered rollers 67 disposed between the races 65 and 66. The inner races 65 are journalled on the output shaft 12 and the outer races 66 are disposed within an annular cavity 68 formed in the housing 55.

The transmission mechanism 10 may have a neutral condition, a forward drive condition, and a reverse drive condition.

Neutral condition is obtained when both the clutch 16 and the brake 18 are disengaged. In this condition, driving torque from the engine drives the drive shaft 11 and the sun gear 24 of the gear set 15. There is no reaction member for the gear set 15 in this condition and the forward rotation of the sun gear 24 causes the planet gears 25 and 26 to rotate and drive the ring gear 23 freely in the forward direction. There is thus no driving torque supplied to the intermediate shaft 29 or to the driven shaft 12.

Forward drive condition is obtained when the clutch 16 is engaged and the brake 18 is disengaged. The clutch 16 is engaged by supplying fluid under pressure to the servomotor 17 causing the piston 37 to move axially to the right as shown in Fig. 1 and press the friction discs 32 and 33 into engagement. Engagement of the clutch 16 locks together the ring gear 23, and the sun gear 24, so that the gear set 15 thereafter is caused to rotate as a unit and drives the planet gear carrier 27 and the intermediate shaft 29 at a one-to-one speed ratio with respect to the drive shaft 11. The intermediate shaft 29 drives the planet gear carrier 61 of the gear set 53 in the forward direction and at the same speed as the drive shaft 11. The sun gear 58 serves as a permanently fixed reaction member for the gear set 53, and the planet gears 59 and 60 driven by the planet gear carrier 61 drive the ring gear 57 and driven shaft 12 forwardly at a reduced speed ratio with respect to the planet gear carrier 61.

Reverse drive condition is obtained when the brake 18 is engaged and the clutch 16 is disengaged. The brake 18 is engaged by supplying fluid under pressure to the servomotor 19 so as to cause the piston 45 to move to the right as shown in Fig. 1. The piston 45 acts against the pressure plate 43 which, in turn, presses the friction discs 40 into engagement with the disc 41 and with the end pressure plate 42. The engaged brake 18 functions to hold stationary the drum 28 and the ring gear 23 of the gear set 15. In this condition, the forwardly rotating drive shaft 11 and sun gear 24 drive the planet gears 26 in a reverse direction. The reversely rotating planet gears 26 in turn drive the planet gears 25 in the forward direction. The stationary ring gear 23 in mesh with the planet gears 25 serves as a fixed reaction element and as the planet gears 25 rotate forwardly, they walk around the interior of the ring gear 23 carrying the planet gear carrier 27 in a reverse direction with respect to the drive shaft 11. The reversely rotating planet gear carrier 27 drives the intermediate shaft 29 which in turn drives the planet gear carrier 61 in the reverse direction. The fixed sun gear 58 serves as a reaction element for the gear set 53, and the ring gear 57 and driven shaft 12 are driven by the carrier 61 in the reverse direction at a reduced speed ratio with respect to the drive shaft 11.

It is contemplated that the forward transmission unit 13 can be utilized independently of the rear transmission unit 14. For such application, the intermediate shaft 29 functions directly as an output shaft in lieu of the driven shaft 12.

The fluid circulating system for the transmission 10, in general, comprises a fluid sump 70 defined by the bottom interior of the housing 22, the pump 20, a rotary selector valve 71, and a fluid ejector 72. An inlet port 73 of the pump 20 is connected to the sump 70 through a fluid supply conduit 74, and an outlet port 75 opens into a conduit 76. The conduits 74 and 76 are formed in the transmission housing 22. The conduit 76 leads to the rotary selector valve 71 which is selectively operable to direct fluid to the servomotor 17 for engaging the clutch 16 or to the servomotor 19 for engaging the brake 18. The valve 71 also functions to direct lubricating fluid to various rotating parts of the transmission 10. The structure and operation of the rotary valve 71 is more completely shown and described in the co-pending application of D. W. Kelbel, Serial No. 641,125, filed February 19, 1957.

A portion of the fluid supplied to the selector valve 71 may be passed directly to the fluid ejector 72 or, alternatively, may be transmitted to a fluid cooler (not shown) and from thence to the fluid ejector 72.

The fluid ejector 72, in general, comprises a longitudinally extending passage 77 bored in the transmission housing 55 and having an inlet port 78 and an outlet port 79. The inlet port 78 is in communication with the rotary selector valve 71 through a suitable conduit (not shown). The outlet port 79 of the fluid ejector 72 is located in close proximity to coextensive openings 80 and 80a formed in the housings 22 and 55 respectively.

A lubrication passage 81 is also formed in the housing 55 and connects the longitudinal bore 77 with the rear bearing block 54. A portion of the fluid supplied to the fluid ejector 72 through the port 78 is directed through the channel 81 to the bearing block 54 for lubricating it, as is described in the co-pending application of P. Orr, Serial No. 715,723, filed February 17, 1958.

The fluid under pressure supplied from the pump 20 through the valve 71 and to the fluid ejector 72 leaves the outlet port 79 of the fluid ejector 72 with a substantial velocity and passes through the openings 80 and 80a into the fluid sump 70. The fluid leaving the outlet port 79 functions to wash fluid from the rear transmission housing 55 by aspirating action and maintains the fluid within the rear housing 55 at a desired predetermined level. The fluid entering the fluid sump 70 from the ejector 72 is quite turbulent, and in the absence of the baffle plate 21, the fluid coming in contact with the rotating planetary gear set 15 normally would be whipped into a froth. The baffle plate 21 is inserted in the transmission mechanism 10 for the purpose of suppressing turbulence of the hydraulic fluid within the housing 22 as will be described hereinafter.

The baffle plate 21 is an integral structure formed from a flat piece of sheet metal, preferably steel. The baffle plate 21 comprises a flat generally rectangular body portion 90 defining a generally horizontal plane of reference, a flat portion 91 bent angularly upward in a gradual curve from the plane defined by the body portion 90, and a return curved portion 92 formed on the end of the portion 91. The body portion 90 is formed at one edge with an angularly upward extending tab 93 and with two angularly downward extending tabs 94 and 95 located on opposite corners of the edge of the body portion 90.

The tabs 94 and 95 are separated from the tab 93 by longitudinally extending tabs 96 and 97.

The angularly upward extending portion 91 is notched at 98 to accommodate a dip stick (not shown), when the baffle plate 21 is inserted into the housing 22. The return curved portion 92 is formed with two pairs of spaced holes 99 and 100 through the generally vertical bounding surface thereof, 101 and 102 through the upper portion thereof, and a central hole 103.

The baffle plate 21, being formed of sheet material, is characterized by its resiliency and is adapted to be snapped into place within the transmission housing 22. When properly located within the transmission housing 22, the edges of the holes 99 and 100 of the curved return portion 92 engage and receive the convex surfaces of hemispherical bosses 104 and 105 formed integrally within the housing 22. The tabs 94 and 95 extend under bosses 106 and 107 also formed on the interior of the housing 22. The body portion 90 rests on the top of a ledge 108, and edges 109 and 110 of the tabs 96 and 97 are in contact with the internal wall of the housing 22 at 111 and 112, respectively. The tab 93 is bent upward so as to accommodate a curved portion 113 of the housing 22 extending upwardly from the ledge 108.

The transmission housing 22 is formed with a longitudinally extending ridge 114 and the upper surface of the return curved portion 92 is in contact therewith at 115. The baffle plate 21 thus is retained in a flexed condition within the transmission housing 22 without additional attaching means. The baffle plate 21 is prevented from moving vertically upward or downward by the ridge 114, the ledge 108, and the bosses 104, 105, 106, and 107, and is prevented from longitudinal movement by the bosses 104 and 105 and the inner wall of the transmission housing 22 at points 111 and 112.

Referring now to Fig. 4, there is illustrated a longitudinal sectional view of a transmission housing 22' and a baffle plate 21 disposed therein. The housing 22' is similar to the housing 22 of the transmission mechanism 10, shown in Figure 1, but differs slightly therefrom in its physical dimensions. The housing 22' is designed to accommodate a different model of the transmission mechanism 10 shown in Fig. 1. The baffle plate 21, however, is designed to fit in both transmission housings 22 and 22'. The housing 22' is formed with a fluid return passage 116 which is co-extensive with the hole 103 formed through the curved portion 92 of the baffle plate 21.

The baffle plate 21 is inserted into the housing 22' before the rotating elements of the transmission are assembled therein. The plate 21 is inserted into the housing 22 in an unflexed condition and is disposed as indicated by the dotted line position. A forked tool 117 having two spaced tangs 118 is inserted into the transmission housing 22' with the tangs 118 engaging the baffle plate 21 through the spaced holes 101 and 102. The tool 117 is then pulled toward the left, as shown in Fig. 4, flexing the baffle plate 21 at the curved transition between the portions 90 and 91. The tool 117 then is used to lift the baffle plate 21 upward into a position where the holes 99 and 100 engage and receive hemispherical bosses 104' and 105'. The tool 117 is removed and the baffle plate 21 remains in place in a flexed condition.

When snapped into position within the transmission housing 22', as shown, the baffle plate 21 substantially covers the fluid sump 70' defined on the interior of the housing 22'. When the remaining elements of the transmission mechanism are assembled therein, and hydraulic fluid is added, the baffle plate 21 functions to separate the fluid within the sump from the rotating parts of the transmission, particularly from the planetary gearing.

The baffle plate 21 disclosed by the present invention produces several operational advantages. For example, the baffle plate 21 stratifies the oil flowing into the sump 70 from the fluid ejector 72 and prevents this moving fluid from coming in contact with the rotating planetary gear set 15. The hydraulic fluid is thus prevented from being whipped into froth by the planetary gear set and improved circulation of the fluid through the transmission is realized. The absence of oil froth within the transmission mechanism 10 also results in improved lubrication of the rotating parts and obviates leakage of fluid through the transmission breather cap. The suppression of oil froth also results in consistently reliable and quiet operation of the fluid pump and of the other elements of the fluid circulating means; and also allows the utilization of a smaller fluid cooler, than would be possible if oil froth were present, to produce equivalent fluid cooling.

It is to be understood that my invention is not to be limited to the specific constructions and arrangements shown and described except only insofar as the appended claims may be so limited, as it will be apparent to those skilled in the art that changes may be made without departing from the principles of the invention.

I claim:

1. In a transmission mechanism having rotatable parts therein, the combination of a housing defining a fluid sump on the interior thereof and a flexible baffle means flexed so as to retain itself in said sump for separating the rotatable parts of the transmission mechanism from the fluid contained within said sump.

2. In a transmission mechanism having rotatable parts therein, the combination of fluid circulating means including a fluid ejector for circulating fluid through the transmission mechanism, and a flexible baffle plate flexed so as to be self-retained within the transmission and effective to suppress fluid turbulence created by said ejector.

3. In a transmission mechanism, having rotatable parts therein, the combination of a transmission housing defining a fluid sump on the interior thereof and formed with a plurality of bosses, and a resilient baffle plate adapted to be disposed within said transmission housing substantially covering said sump and effective to isolate the fluid within said sump from the rotating parts of the mechanism, said baffle plate being formed and flexed for mounting in a self retaining flexed condition on said bosses.

4. A baffle plate adapted to be inserted within a transmission housing comprised of unitary resilient sheet material and characterized by a generally flat rectangular body, an angularly upward extending flat portion and a return curved end portion, said plate also being formed and flexed for mounting said baffle plate in a self retaining flexed condition within a transmission housing.

5. In a transmission mechanism, the combination of a housing defining a fluid sump on the interior thereof, a drive shaft and a driven shaft rotatably supported by said housing, planetary gearing disposed within said housing and interconnecting said shafts, hydraulic fluid circulating means including a pump and a fluid ejector for circulating fluid through the transmission, and a flexible baffle plate flexed so as to be self-retained within said housing and effective to separate said planetary gearing from the fluid contained within said sump and suppress fluid turbulence created by said ejector.

References Cited in the file of this patent

UNITED STATES PATENTS

| | | |
|---|---|---|
| 2,093,372 | Short et al. | Sept. 14, 1937 |
| 2,408,923 | Frederick | Oct. 8, 1946 |
| 2,464,012 | Wallace | Mar. 8, 1949 |
| 2,743,627 | Christenson | May 1, 1956 |
| 2,765,525 | O'Neill | Oct. 9, 1956 |
| 2,769,230 | Nystrom | Nov. 6, 1956 |
| 2,775,308 | Senkowski et al. | Dec. 25, 1956 |
| 2,829,736 | Troemel | Apr. 8, 1958 |